United States Patent Office 3,536,752
Patented Oct. 27, 1970

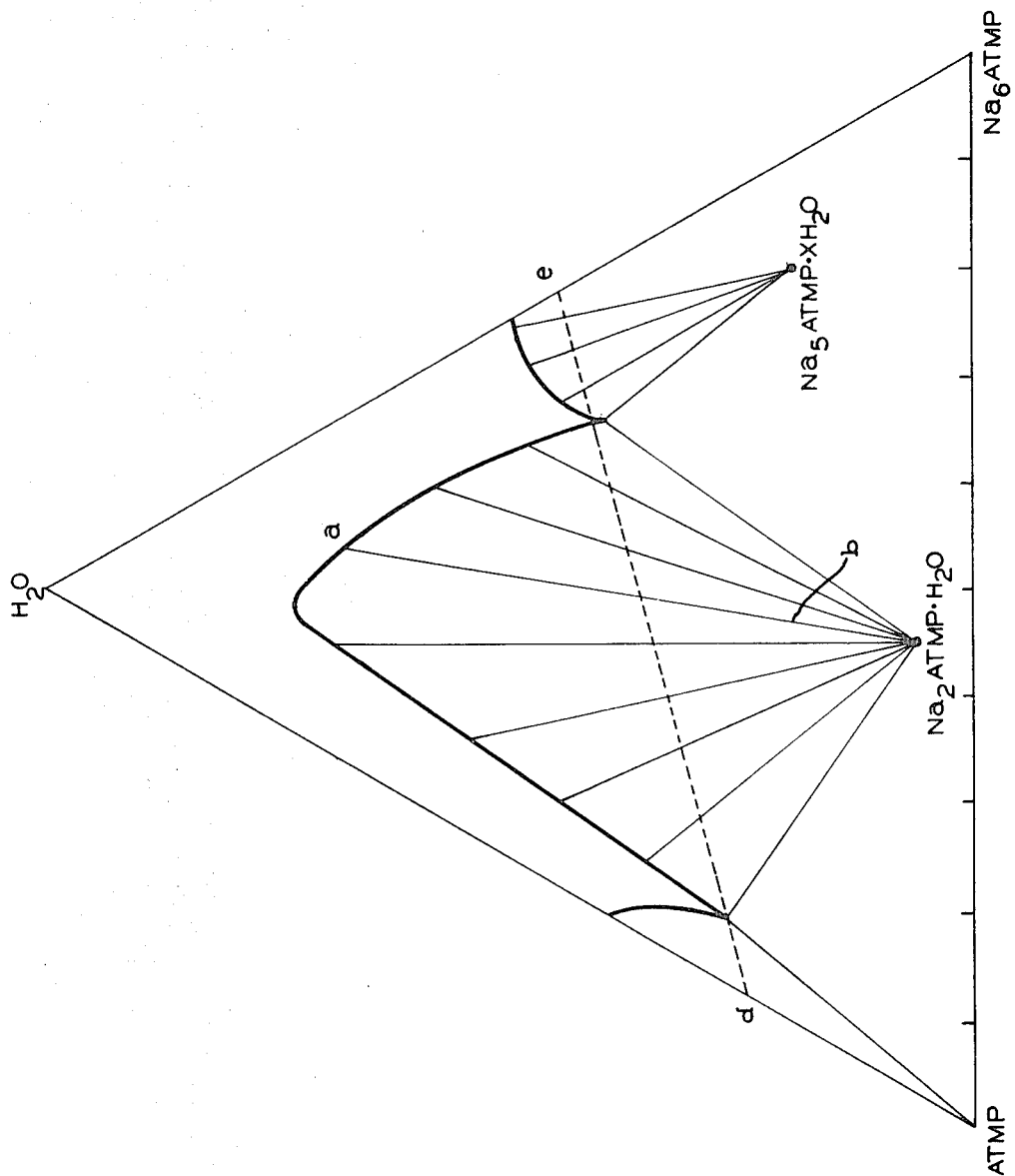

3,536,752
DIALKALI METAL SALTS OF AMINO TRI-(ALKYLIDENEPHOSPHONIC ACIDS)
Marvin M. Crutchfield, St. Louis, Mo., assignor to Monsanto Company, St. Louis, Mo., a corporation of Delaware
Application Apr. 14, 1967, Ser. No. 631,005, which is a continuation-in-part of application Ser. No. 294,757, July 12, 1963. Divided and this application Aug. 27, 1968, Ser. No. 778,880
Int. Cl. C07c 9/02, 105/02
U.S. Cl. 260—502.5
10 Claims

ABSTRACT OF THE DISCLOSURE

Solid, non-hygroscopic dialkali metal amino tri(alkylidene phosphonates) are described as well as processes or preparing the same by reacting in an aqueous solution from about 0.5 moles to about 4 moles of alkali metal per mole of free phosphonic acid and recovering the salt compound from the aqueous solution. The described phosphonic salts are disclosed as finding utility in many and various fields which include their use as sequestering agent, deflocculating agents, leavening agents and acidulants, particularly as acidulants in compositions for cleaning metal surfaces such as, copper, brass, silverplate, aluminum and the like.

---

This application is a division of application Ser. No. 631,005, filed Apr. 14, 1967 and now abandoned which in turn is a continuation-in-part of application Ser. No 294,757, filed July 12, 1963 and now abandoned.

This invention relates to the dialkali metal salts of amino tri(alkylidene phosphonic acids) and especially the disodium and dipotassium salts thereof and to processes for preparing the same.

An object of this invention is to provide new and useful salt compounds of amino tri(alkylidene phosphonic acids).

Another object of this invention is to provide processes for preparing the new and useful salt compounds of amino tri(alkylidene phosphonic acids).

A further object is to provide new and useful salt compounds of amino tri(alkylidene phosphonic acids) which exhibit, among other things, the property of being non-hygroscopic.

A still further object of this invention is to provide new and useful salt compounds of amino tri(alkylidene phosphonic acids) which exhibit, among other things, the ability to form saturated solutions in aqueous media which have a relatively low viscosity.

Further objects of this invention will become apparent from a reading of the following detailed description.

This invention is directed to new and useful salt compounds of amino tri(alkylidene phosphonic acids), that is, the dialkali metal salts, and to processes for preparing the same, said compounds having in one form the general formula (1) 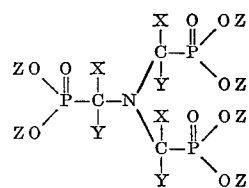

wherein X and Y are selected from the group consisting of hydrogen and alkyl groups containing from 1 to about 20 carbon atoms; and Z is a member selected from the group consisting of hydrogen ions and alkali metal ions with 4 of the members represented by Z being hydrogen ions.

It should be noted the salts of the instant invention may also exist in an inner salt form having the general formula (2) 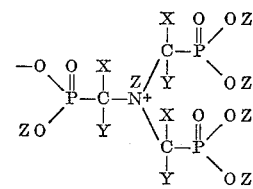

wherein the groups represented by X, Y and Z are the same as those set forth for the foregoing Formula 1 and it is intended that the foregoing Formula 1 cover the inner salt form of the compounds of the instant invention.

When the symbols X and Y represent alkyl groups, such groups may be either a straight chain or branched chain structure although a straight chain structure is preferred. In addition, when the symbols X and Y represent alkyl groups, it is preferred that such groups be lower alkyl groups, i.e., less than about 5 carbon atoms. For most end use applications, the compounds or the instant invention should preferably contain not more than 30 carbon atoms in the groups represented by X and Y, and there are few, if any, end uses in which the foregoing groups contain more than a total of 60 carbon atoms.

As used herein, the term alkali metal includes lithium, sodium, potassium, rubidium and cesium. Because of their availability and relative inexpensiveness, the sodium and potassium salts are the preferred salts of the instant invention.

The compounds of the instant invention are useful as sequestering agents for metal cations, such as $Fe^{+++}$, in aqueous media and/or as deflocculating agents for finely-divided materials in aqueous media, such as oil-well drilling muds, kaolin clay and the like. Because of their mild acidity, the sodium and potassium compounds of the instant invention are also useful as leavening agents and acidulants.

As hereinbefore mentioned, compounds of the instant invention exhibit such beneficial properties as being non-hygroscopic. This enables their use as stable, free-flowing solids in applications where the solid form of such compounds is desired. Also stable, free-flowing solids are of particular advantage in exhibiting improved handling and storage characteristics. In addition, compounds of the instant invention exhibit the ability to form saturated solutions in aqueous media which have a relatively low viscosity. For example, viscosity measurements (centipoises) on solutions of equivalent molal concentrations at 25° C. were made with a Brookfield Model LVF Syncro-Lectric Viscometer equipped with an ultra low viscosity attachment. An average of five readings was taken for each measurement with the following results: disodium tri(methylenephosphonate) monohydrate, 2.53 cps.; and dipotassium tri(methylenephosphonate), 2.19 cps. Water in the same test gave the result, .92 cps. The concentration used, .69 molal, corresponds to a saturated solution of the least soluble salt tested, disodium tri(methylenephosphonate) monohydrate. As can be appreciated, such solutions, because of their relatively low visocity, are advantageous in applications where the liquid form of such compounds is desired, especially the more concentrated liquid form, and is of particular advantage in the handling and use of such solutions in the preparation of the solid forms of the compounds.

It should be noted that the dialkali metal salts of amino tri(alkylidene phosphonic acids) can usually be obtained in either a crystalline anhydrous or a crystalline hydrated form, usually the monohydrate, with such crystalline forms exhibiting unique X-ray diffraction patterns. In addition, these compounds can also be formed in an amorphour state which exhibits relatively poor crystallinity.

Compounds of the instant invention can be prepared by reacting in an aqueous solution the free acids, i.e., amino tri(alkylidene phosphonic acids), with an appropriate amount of a suitable alkali metal material. In general, suitable alkali metal materials are inorganic alkali metal bases or salts of volatile acids which contain essentially the desired cation. In particular, such alkali metal materials which are water-soluble and are capable of ionizing to form the desired alkali metal cation are preferred. Such alkali metal materials include the water-soluble salts, oxides and hydroxides, such as $Na_2CO_3$, NaCl, NaOH, $Na_2O$, $K_2CO_3$, KCl, $KNO_3$, KOH, $K_2O$, and the like, including mixtures thereof. Although alkali metal materials of lithium and cesium can in some cases be used in practicing this invention, they are relatively expensive and are not readily available and thus are not believed to offer the advantages for use as the foregoing alkali materials.

In general, appropriate amounts of the foregoing alkali metal materials for use in practicing the present invention are those which form an aqueous solution containing between about 0.5 to about 4 moles of the alkali metal per mole of the free amino tri(alkylidene phosphonic acid). However, it is preferred that the mole ratio be about the stoichiometric amount, that is, in mole ratio of about 2 moles of the alkali metal to about 1 mole of amino tri(alkylidene phosphonic acid). The free acid can be added to an aqueous solution or slurry containing the alkali metal material or the alkali metal material can be added to an aqueous solution or slurry containing the free acid. There does not appear to be any particular advantage in the order of addition of the reactants. Generally speaking, the water of solution should be enough to dissolve or adequately suspend both reactants therein and there does not appear to be an operative upper limit as to the amount of water which can be used, since to recover the compounds the solution, if too dilute, can be concentrated by evaporation of excess solvent. The compounds can be recovered from the aqueous solution by various methods, such as, removing the water by evaporation including vacuum evaporation, allowing the compounds to crystallize by cooling a relatively hot saturated aqueous salt solution, allowing the compounds to crystallize from a saturated solution by seeding the solution, precipitating by the addition of a miscible solvent in which the salts are less soluble, such as methanol, ethanol, acetone, etc., and the like. Usually, the amorphous forms of the compounds can be formed when the water of solution is quickly removed under high temperature conditions such as by flash drying, drum drying, and the like.

As previously mentioned, the compounds of the present invention can be prepared from an aqueous solution containing about 0.5 to about 4 moles of the alkali metal per mole of the free amino tri(alkylidene phosphonic acid) which is completely unexpected since such indicates that a crystalline mono-, tri- or tetra-alkali metal salt cannot be prepared by the process as described herein. The foregoing unexpected result was found from a condensed phase diagram, see the attached drawing, for the system amino tri(methylenephosphonic acid) (ATMP)—fully neutralized hypothetical hexasodium amino tri-(methylenephosphonic acid) ($Na_6ATMP$)—water ($H_2O$) at 25° C. by Schreinemaker's method of wet residue. F. A. H. Schreinemaker, Z. Phys. Chem., 11, 75 (1893).

Referring now to the drawing a number of compositions spaced along composition line d–e are prepared by weighing calculated quantities of recrystallized ATMP, 51.1% NaOH solution, and $H_2O$ into 15 mm. glass tubes which are subsequently sealed and allowed to equilibrate at 25° C. for approximately one month with intermittent shaking on a mechanical vibrator. At the end of this time, the tubes are opened and weighed samples of both the solid and liquid phases are analyzed by an acid-base titration procedure. Total ATMP content is determined by the milliequivalents of HCl consumed in a back titration from the pH 9.5 to the pH 3.5 endpoints, while the sodium ion content is calculated from the previous data plus the milliequivalents of NaOH required to reach the pH 9.5 endpoint from the original equilibrium composition. $H_2O$ is determined by difference. Tie lines, for example a–b, connecting the equilibrium liquid and wet solid compositions extrapolate to define a point which gives the composition of the pure solid phase in the absence of an adsorbed or occluded solvent. By this technique the disodium amino tri(methylenephosphonate) mono-hydrate is found to be the only crystalline form in the aqueous sodium system in the region of 0.5 Na/ATMP to 4.0 Na/ATMP on a mole basis, its solubility is about 27 weight percent at 25° C. in an aqueous solution of its own composition.

The amino tri(alkylidene phosphonic acids) can be prepared by various different methods. One method is to prepare the free acids by reacting ammonia, compounds containing a carbonyl group, such as an aldehyde or ketone, and orthophosphorus acid. Generally, by heating the mixture above 50° C. at a low pH, preferably about pH 2 or below, the reaction is usually completed in about 1 to 5 hours. The following is an illustration of the reaction in equation form using formaldehyde as the carbonyl compound:

(3)
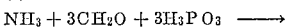
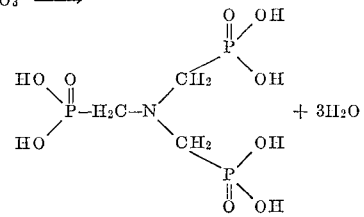

Another method is to prepare the ester of amino tri(alkylidene phosphonic acids) by reacting ammonia, compounds containing the carbonyl group, such as an aldehyde or ketone and a dialkyl phosphite. The corresponding free acid can then be preperade by hydrolysis of the ester with an inorganic acid, such as, concentrated HCl or HBr. Generally, by refluxing the ester and inorganic acid at reflux temperature for a period usually about 3 hours is all that is required for the hydrolysis. The following is the preparation of the ester in the equation form using formaldehyde as the carbonyl compound:

(4)
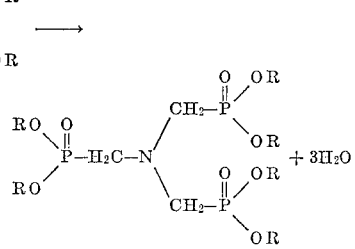

Compounds of the instant invention which are especially preferred for use as sequestering agents and/or deflocculating agents are the dialkali metal salts of amino tri(methylene phosphonic acid) and especially the sodium and potassium salts thereof, said dialkali metal salts having the following formula:

(5)

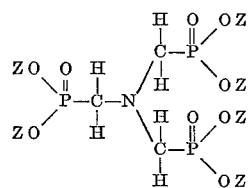

wherein Z is a member selected from the group consisting of hydrogen ions and alkali metal ions with 4 of the members represented by Z being hydrogen ions.

The following examples are presented for illustrative purposes with parts by weight being given unless otherwise indicated.

EXAMPLE I

In a reaction vessel about 299 parts of amino tri(methylene phosphonic acid) are added to about 800 parts of a 10% by weight sodium hydroxide solution and the resulting reaction product evaporated to dryness at about 130° C. The resulting product is disodium amino tri(methylene phosphonate).

EXAMPLE II

In a reaction vessel about 100 parts of the disodium amino tri(methylene phosphonate) are suspended in water of an amount which allows the presence of excess solid salt. After about 3 days, the excess solid is filtered off and air-dried. Quantative NMR measurements in $D_2$ indicate monohydrate crystals having the followinng X-ray diffraction pattern:

X-ray diffraction data[a] for $Na_2H_4N(CH_2PO_3)_3 \cdot H_2O$

| Line[b] | d., A. |
|---|---|
| 1 | 3.27 |
| 2 | 3.66 |
| 3 | 3.57 |
| 5 | 10.13 |
| 5 | 4.77 |
| 6 | 3.79 |
| 7 | 4.12 |
| 8 | 8.38 |
| 9 | 3.40 |
| 10 | 3.47 |
| 11 | 5.14 |
| 12 | 2.51 |
| 13 | 2.99 |
| 14 | 5.98 |
| 15 | 2.30 |

[a] CuK α radiation.
[b] Fifteen strongest lines in order of decreasing intensity.

EXAMPLE III

In a reaction vessel about 598 parts of a 50% by weight amino tri(methylene phosphonic acid) solution are reached with about 138 parts of anhydrous $K_2CO_3$ and the resulting reaction product evaporated to dryness in a vacuum oven at 60° C. The resulting crystalline compound, dipotassium amino tri(methylene phosphonate), gives the following X-ray diffraction pattern:

X-ray diffraction data[a] for $K_2H_4N(CH_2PO_3)_3$

| Line[b] | d., A. |
|---|---|
| 1 | 3.55 |
| 2 | 3.83 |
| 3 | 3.65 |
| 4 | 3.74 |
| 5 | 2.56 |
| 6 | 7.89 |
| 7 | 3.05 |
| 8 | 10.77 |
| 9 | 2.66 |
| 10 | 5.30 |
| 11 | 2.15 |
| 12 | 2.51 |
| 13 | 3.48 |
| 14 | 3.37 |
| 15 | 4.27 |

[a] CuK α radiation.
[b] Fifteen strongest lines in order of decreasing intensity.

EXAMPLE IV

In a reaction vessel about 100 parts of the dipotassium amino tri(methylene phosphonate) are dissolved in about 200 parts of water and evaporated to dryness at about 25° C. in a vacuum oven. Quantative NMR measurements in $D_2O$ indicate monohydrate crystals having the following X-ray diffraction pattern:

X-ray diffraction data[a] for $K_2H_4N(CH_2PO_3)_3 \cdot H_2O$

| Line[b] | d., A. |
|---|---|
| 1 | 3.07 |
| 2 | 3.65 |
| 3 | 5.05 |
| 4 | 2.66 |
| 5 | 3.46 |
| 6 | 9.35 |
| 7 | 4.62 |
| 8 | 4.70 |
| 9 | 3.97 |
| 10 | 2.53 |
| 11 | 3.30 |
| 12 | 3.56 |
| 13 | 2.47 |
| 14 | 2.17 |
| 15 | 8.07 |

[a] CuK α radiation.
[b] Fifteen strongest lines in order of decreasing intensity.

EXAMPLE V

In a reaction vessel about 299 parts of amino tri (methylene phosphonic acid) are added to about 90 parts of a 30% by weight sodium hydroxide solution and after about 2 days the solids precipitated therein are collected and analyzed as disodium amino tri(methylene phosphonate) monohydrate.

EXAMPLE VI

In the same manner as in Example V, about 299 parts of amino tri(methylene phosphonic acid) are added to about 280 parts of a 50% by weight sodium hydroxide solution to yield, as a solid product, disodium amino tri (methylene phosphonate) mono-hydrate.

EXAMPLE VII

In the same manner as in Example V, about 299 parts of amino tri(methylene phosphonate) are added to about 168 parts of a 50% by weight potassium hydroxide solution to yield, as a solid product, dipotassium amino tri (methylene phosphonate) mono-hydrate.

Other compounds of the instant invention which can be prepared from the corresponding free acids according to the procedures described hereinabove and illustrated by the foregoing examples include the following:

disodium amino tri(ethylidene phosphonate)
dipotassium amino tri(ethylidene phosphonate)
disodium amino tri(propylidene phosphonate)
dipotassium amino tri(propylidene phosphonate)
disodium amino tri(2-butylidene phosphonate)
dipotassium amino tri(2-butylidene phosphonate)
disodium amino tri(2-tetradecylidene phosphonate)
dipotassium amino tri(2-tetradecylidene phosphonate)
disodium amino tri(hendecylidene phosphonate)
dipotassium amino tri(hendecylidene phosphonate)
disodium amino tri(octadecylidene phosphonate)
dipotassium amino tri(octadecylidene phosphonate)

disodium amino di(methylene phosphonate) mono(ethylidene phosphonate)
dipotassium amino di(methylene phosphonate) mono(ethylidene phosphonate)
disodium amino di(methylene phosphonate) mono(tetradecylidens phosphonate)
dipotassium amino di(methylene phosphonate) mono(tetradecylidene phosphonate)
disodium amino mono(methylene phosphonate) di(ethylidene phosphate)
dipotassium amino mono(methylene phosphonate) di(ethylidene phosphonate)
disodium amino mono(methylene phosphonate) di(tetradecylidene phosphonate)
dipotassium amino mono(methylene phosphonate) di(tetradecylidene phosphonate)

In addition, other dialkali metal salts of the foregoing corresponding free acid compounds may be prepared by the process of the instant invention, such as the lithium and cesium salts, as well as mixed alkali metal salts.

An especially advantageous utility as acidulants for the dialkali metal amino tri(alkylidene phosphonic acids), particularly the di-sodium and -potassium amino tri(methylene phosphonates), is as an acid-reacting cleaning composition which is especially suited for cleaning metal surfaces, such as, copper, brass, silverplate, aluminum and the like and particularly household metal articles of the foregoing metals, such as, pots, pans and the like. Due to the acidic properties and low solubility in water, they are advantageously employed for this use since they not only are effective metal cleaners but also can function as abrasives when properly used without irritating or burning the hands of the person cleaning the metal article such as a pot or pan. The free acids, it should be noted, are completely inappropriate for this use since they cannot function readily as an abrasive metal cleaner and are of such acidic strength as to preclude their use in cleaning metal articles such as pots and pans without appropriate safeguards for the hands of the person cleaning such articles due to their irritating or burning effect.

For use as a metal cleaner it is preferred that the particle size of dialkali metal salt be less than about 60 mesh and greater than about 2 microns or 325 mesh and especially preferred is from about 100 mesh to 200 mesh. All foregoing mesh sizes are U.S. Screen Mesh Sizes.

In order to provide effective cleaning action the acid-cleaning composition may advantageously contain synthetic detergents of the anionic and/or nonionic surface active compound classes. Anionic surface active compounds can be broadly described as compounds which contain hydrophilic and hydrophobic groups in their molecular structure and which ionize in an aqueous medium to give anions containing the hydrophobic group. These compounds are usually the alkali metal salts of organic sulfonates or sulfates, particularly the sodium salts, such as alkyl aryl sulfonates containing about 10 to about 20 carbon atoms in the alkyl group (e.g. sodium dodecylbenzene sulfonate), sulfates of straight chain alcohols containing from about 10 to about 20 carbon atoms (e.g. sodium laurylsulfate) and the like. Because in practicing the present invention these anionic surface active compounds are generally used in relatively strong acidic conditions, it is preferred that the alkali metal salts of the organic sulfonates rather than the organic sulfates be used. Nonionic surface active compounds can broadly be described as compounds which do not ionize but acquire hydrophilic characteristics from an oxygenated side chain, usually polyoxyethylene; while the hydrophobic part of the molecule may come from fatty acids, phenols, alcohol, amides or amines. For example purposes only the polyethylene oxide condensates of alkyl ($C_8$–$C_{16}$) phenols, containing from about 5 to about 20 moles of ethylene oxide per mole of phenol (e.g. condensation product formed from 1 mole nonylphenol and 10 moles of ethylene oxide), the condensation product of aliphatic alcohol containing from about 8 to 20 carbon atoms and ethylene oxide containing about 5 to about 20 moles of ethylene oxide per mole of alcohol (e.g. condensation product formed from 1 mole tridecanol and 12 moles of ethylene oxide) are suitable nonionic surface active compounds in practicing the invention. Although, in general, any amounts of the synthetic detergents may be used it is preferred that not over about 10% by weight be used with a range of between about 0.5% to 5% by weight particularly preferred.

From the foregoing it can be appreciated that a dry, free-flowing, particulate solid acid-reacting cleaning composition containing, if desired, synthetic detergents of the anionic and nonionic surface active compound types, can be prepared and when used in aqueous systems functions effectively as an acid cleaning composition. In addition, paste forms and liquid forms of the acid-reacting composition may also be prepared. These forms are readily prepared by admixing the solid, particulate acid-reacting composition, with or without the synthetic detergent, as desired, with water and/or water soluble liquid organic materials such as alcohols, particularly lower aliphatic monohydric alcohols (methyl alcohol, ethyl alcohol, propyl alcohol, isopropyl alcohol and the like), dihydric alcohols (glycols and the like) and trihydric alcohols (glycerol and the like) which are relatively chemically inert to the phosphonate salt. Depending on the amount of the organic material used the composition can either be in the liquid form or a paste form. For example, from about 1% to about 10% by weight organic material gives a suitable paste like consistency; whereas from about 10% to about 90% by weight organic material gives a suitable liquid consistency product. Also, it should be noted that the liquid and paste forms of the cleaning composition retain the advantageous properties which the solid particulate acid-reacting compositions possess.

The amount of the acid-reacting composition to be used in aqueous systems may vary depending upon, inter alia, the type of metal to be cleaned, degree of cleaning necessary, conditions of use, such as, water temperature, amount of hand scrubbing necessary, if any, and amount of water present. In general, the amounts necessary for effective cleaning action can readily be determined empirically for optimization of effectiveness.

The following examples are presented to illustrate this embodiment of the invention, with parts by weight being used in the examples unless otherwise indicated.

EXAMPLE VIII

The following composition is provided:

Disodium amino tri(methylene phosphonate) monohydrate (—100 mesh) _____ 80
Nonionic aliphatic polyoxyethylene ether type surface active agent _____ 1

The above additives are admixed by hand with the use of a spatula in a mixing vessel with a dry, relatively free flowing product resulting. This product when wetted with water to a paste-like consistency and used on metallic surfaces such as copper, brass, silverplate, aluminum, and the like with slight hand rubbing followed by thorough water rinsing exhibits the ability of effectively remove oxidant stains, dirt, grease and the like therefrom.

EXAMPLE IX

The following composition is provided:

Disodium amino tri(methylene phosphonate) monohydrate (—325 mesh) _____ 1
Glycerol _____ 2

The above additives are admixed to produce an acid-reacting cleaning composition with a lotion-like consistency. This product when used on tarnished copper and brass pieces followedby thorough water rinsing exhibits the ability to remove oxidant stains, dirt, grease, and the like therefrom without the necessity for using water other than for rinsing purposes.

What is claimed is:

1. A process for making solid, nonhygroscopic dialkali metal salt compound of amino tri(alkylidene phosphonic acid) having the formula

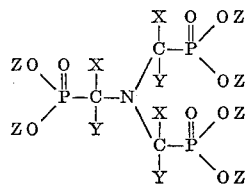

wherein X and Y are selected from the group consisting of hydrogen and alkyl groups containing from 1 to about 20 carbon atoms, and Z is a member selected from the group consisting of hydrogen ions and alkali metal ions with 4 of the members being hydrogen ions, comprising reacting in an aqueous solution the corresponding free acid with an alkali metal material selected from the group consisting of water-soluble, alkali metal hydroxides, oxides and salts of volatile acids in a molar ratio of about 0.75 moles of said material per mole of said free acid and recovering said compound from said aqueous solution.

2. A process according to claim 1, wherein said alkali metal ions are selected from the group consisting of sodium ions and potassium ions.

3. A process according to claim 2, wherein said X and Y are hydrogen.

4. A process according to claim 3, wherein said alkali metal ions are sodium ions.

5. A process according to claim 3, wherein said alkali metal ions are potassium ions.

6. A process for making olid, non-hygroscopic dialkali metal salt compound of amino tri(alkylidene phosphonic acid) having the formula

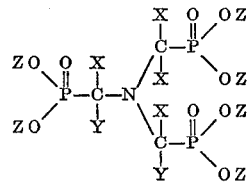

wherein X and Y are selected from the group consisting of hydrogen and alkyl groups containing from 1 to about 20 carbon atoms, and Z is a member selected from the group consisting of hydrogen ions and alkali metal ions with 4 of the members being hydrogen ions, comprising reacting in a aqueous solution the corresponding free acid with an alkali metal material selected from the group consisting of water-soluble, alkali metal hydroxides, oxides and salts of volatile acids in a molar ratio of about 3.5 moles of said material per mole of said free acid and recovering said compound from said aqueous solution.

7. A process according to claim 6, wherein said alkali metal ions are selected from the group consisting of sodium ions and potassium ions.

8. A process according to claim 7, wherein said X and Y are hydrogen.

9. A process according to claim 7, wherein said alkali metal ions are sodium ions.

10. A process according to claim 7, wherein said alkali metal ions are potassium ions.

References Cited

UNITED STATES PATENTS

| | | | |
|---|---|---|---|
| 2,304,157 | 12/1942 | Engelmann et al. | 260—502.5 |
| 2,328,358 | 8/1943 | Pikl | 206—502.5 |
| 2,599,807 | 6/1952 | Bersworth | 260—502.5 |
| 2,841,611 | 7/1958 | Bersworth | 260—502.5 |
| 2,964,549 | 12/1960 | Ramsey et al. | 260—502.5 |
| 3,234,124 | 2/1966 | Irani | 260—502.5 |
| 3,288,846 | 11/1966 | Irani et al. | 260—502.5 |

OTHER REFERENCES

Petrov et al., "Chem. Abstracts," vol. 54 (1960), p. 259.

BERNARD HELFIN, Primary Examiner

J. E. EVANS, Assistant Examiner

U.S. Cl. X.R.

210—38; 252—8.5, 145; 260—945